July 10, 1962 W. W. BAGNUK ETAL 3,043,357
PNEUMATIC TIRES
Filed Oct. 12, 1959

INVENTORS
WILLIAM W. BAGNUK
DONALD L. SWEET

BY *Paul F. Stetz and Frank J. Earnheart*

ATTORNEY

United States Patent Office 3,043,357
Patented July 10, 1962

3,043,357
PNEUMATIC TIRES
William W. Bagnuk, Akron, and Donald L. Sweet, Cuyahoga Falls, Ohio, assignors to The General Tire & Rubber Company, a corporation of Ohio
Filed Oct. 12, 1959, Ser. No. 846,007
8 Claims. (Cl. 152—361)

The present invention relates to pneumatic tires.

It has been suggested heretofore that the stability and wear resistance of pneumatic tires, particularly those which are used in heavy-duty applications such as truck tires, may be improved by incorporating relatively stiff breaker strips just below and coextensive with the tread portion of the tire. The breaker strips in effect make the outer periphery or tread portion substantially relatively rigid as compared to the side wall. Consequently, the side wall portion of the tire will be relatively free to flex and absorb the shock attendant contact of the tread with obstructions such as rocks, sharply uneven pavement and the like. Tires so constructed are usually inflated to a lower pressure than normal based on load which, in combination with the rigidity imparted by the use of the breaker strips, provides greater contact area between the tread and the road surface. This greater contact area enhances the stability as mentioned hereinabove. The breaker strips also restrain and confine the inner plies of the tire against radial extension and this too enhances the stability property.

It has previously been suggested that a plurality of such breaker strips are most desirable and that each strip should be composed of a plurality of metal cords, wires, cables, ribbons or the like, embedded in a rubber matrix in mutually parallel relationship. The wire elements in adjacent strips are usually disposed in angular relationship. It has been found most desirable to have the wires disposed to form an acute angle, e.g., usually 5° to 30° with the peripheral centerline of the tire.

A construction alleged to possess the optimum in properties employs three breaker strips, the bottom two disposed with their wires oppositely inclined to form an acute angle of about 10° with the peripheral centerline and the uppermost strip disposed with its wires forming a less acute angle. We have found it to be obvious that the greatest strength of the individual breaker strips, pads, or layers as described hereinabove is in the direction of the mutually parallel wires. A tire construction employing three such breaker pads thus is strongest in resisting forces directed against the tire from the three angles corresponding to the angular relationship of the wires in the individual breaker strips. Unfortunately, forces directed against the tire from other directions must depend upon a resistance thereto which is appreciably less.

Realizing that a tire may be subjected to forces tending to distort it, which forces may be applied from any direction, it is a principal object of the present invention to provide a tire construction which is improved over the tire construction described hereinabove.

It is a particular object of the present invention to provide a tire construction which features and employs a novel breaker strip or pad composition.

It is also an object of the present invention to provide a tire construction which is possessed of improved stability and improved resistance to wear and shock under service conditions.

It is still another and most important object of the present invention to provide such a tire construction featuring a plurality of wire filament-containing breaker strips, one of which possesses the inherent ability to resist forces and shocks transmitted from any direction.

The foregoing and other objects of the present invention will become apparent to those skilled in the art from the following detailed description taken in conjunction with the annexed sheet of drawings on which there is presented, for purposes of illustration only, a single embodiment of the tire construction of the present invention.

In its simplest embodiment the tire construction of this invention contemplates an inner carcass portion, a tread portion spaced therefrom and connected to said carcass portion by a side wall, and a plurality of breaker strips interposed between said carcass and said tread portion, at least one of said breaker strips being composed of a rubber-like stock containing a plurality of randomly disposed lengths of a wire-like substance.

Figure 1:
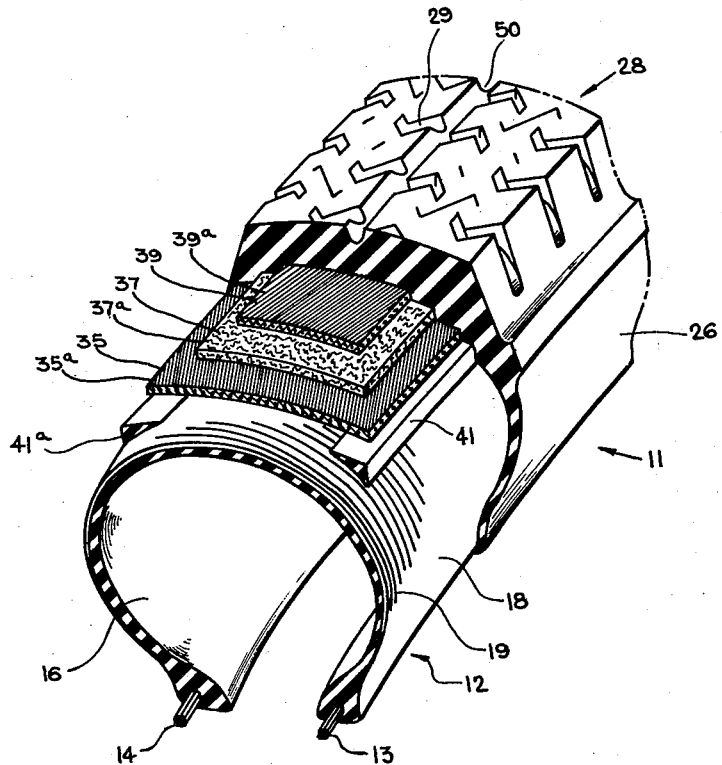
FIG. 1 is a perspective view, with portions broken away, of a tire construction according to the principal embodiment of this invention.

Referring now to the drawings, there is shown in FIG. 1 a tire construction 11 composed of a carcass member 12 which extends in circumferential fashion from a wire bead 13 to a like wire bead 14 spaced from and parallel to the bead 13. The carcass is composed of an inner rubber foundation sheet 16 and an outer reinforcing ply 18 composed of a rubberized textile or fabric or containing a plurality of mutually parallel wire cords or strands 19 disposed in radial relationship with respect to the carcass portion 12. Also extending circumferentially about the tire is side wall portion 26 and tread portion 28, the latter being cut and grooved as at 29 to form the ground contacting surface of the tire. The tread portion 28 is located at the crown of the tire and thereabeneath between it and the carcass portion 12 is positioned the breaker strip reinforcing members as will be now described. A first or inner breaker strip 35 is located on top of the radial ply 18 and is composed of a layer of rubber stock containing mutually parallel wire strands 35$^a$ which are angularly disposed with reference to the peripheral centerline of the tire, which may be taken as the central groove 50 in the tread 28. A second or middle breaker strip 37 is superimposed about the first breaker strip 35 and is composed of a layer of rubber stock containing a plurality of individual short lengths of wire 37$^a$ which are in random relationship to each other as shown. A third or upper breaker strip 39 is superimposed about the second breaker strip 37 and is composed of a rubber stock containing mutually parallel wires 39$^a$ angularly disposed with respect to the peripheral centerline and oppositely inclined to the wire 35$^a$ in the first breaker strip.

Strips 41 and 41$^a$ are located between the radial ply 18 and the first breaker strip 35 and are positioned beneath the lateral side edges of the breaker strip 35. As can be seen, the strips are of triangular configuration in cross section, and, when located as shown, serve to raise the lateral edges of the breaker strips into more nearly parallel relationship with the tread surface 28.

Although the relative positions of the various breaker strips have been described with particularity in discussing the drawings, the breaker strip containing the randomly disposed lengths of wire may be used as either the innermost, the middle, or the outer breaker strip. It is most preferred, however, that this breaker strip be employed as the middle breaker strip as shown in the drawing. This particular arrangement provides the greatest improvement in stability and wear.

The construction of the tire as described in connection with the drawings may be accomplished by plying up the carcass portion of the tire in conventional fashion with the bead portion spread apart, then moving the bead portions close together and inflating the tire whereupon the breaker strips and tread may be assembled onto the crown portion. Subsequent to this operation, the assembled tire is placed in a tire mold and vulcanized.

The breaker strip material containing randomly disposed lengths of wire in accordance with the invention is conveniently produced by combining the rubber stock and the lengths of wire on a rubber mill. The milling is continued only long enough to effect a uniform disposition of the individual wires throughout the rubber stock. We have found it convenient to gradually add the metal filaments to the nip of the previously broken down stock on the mill and in such amount that it constitutes about 10% to 40% based on total weight of the final breaker strip material. In the course of the milling, the lengths of wire become distorted and bent out of their normally linear form. We have found, however, this to be an advantage rather than a disadvantage as might be normally expected in that the amounts of wire filaments used, together with the distortion and bending, achieve some intertwining and intermeshing of the wire filament, which limits the extensibility of the strip material. In addition, this distortion and bending leads to the creation of a network of discontinuous areas of rubber which function in a desirable manner as will be described in more detail hereinafter.

Our experiments with a variety of formulations employing different amounts and lengths of wire filaments leads us to desire a wire length of between about ¼ inch and 1½ inches in length. Most preferable, for achieving the optimum in performance characteristics, is a breaker strip material containing 35% by weight of the wire, each wire having a length of ⅝ inch. The length is critical in that too long a length of wire filaments effects agglomeration during the mixing and leads to a non-uniform material. Too short a length fails to produce a breaker strip having the desired stiffness and formation of the desired interruptions in the phases. The rubber stock in which the metal filaments are incorporated may be any elastomeric rubber-like material capable of vulcanizing and bonding to the steel filaments.

The wire filaments are desirably brass plated prior to incorporation with the rubber stock on the mill in order that during the final vulcanization the wires will be integrally bonded and secured to the rubber stock. Alternatively bonding of the wire with the rubber stock may be achieved by incorporating cobaltous salts and the like, e.g., naphthenates, into the rubber stock as it is being processed on the mill prior to incorporation of the wire filaments.

Generally, the gauge of the wire elements should be selected from a size yielding easy processability in combining with the rubber stock and yielding a breaker strip material capable of functioning in the desired manner. We have found that a gauge of about 0.006 inch to be quite satisfactory. It will be appreciated in this regard that a larger gauge wire will permit a higher weight percent of the wire to be combined with a given weight of rubber stock without encountering undesirable agglomeration.

When the rubber stock and the wire filaments have been mixed on the mill to the degree of disposition desired, a strip of the desired dimensions can be simply and continuously removed from the mill or calender in accordance with conventional practice.

Figure 2:
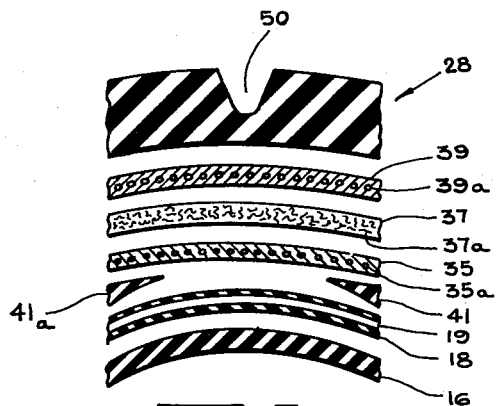
FIG. 2 is an exploded view, in section, illustrating the relative position of the components of the tire of this invention and showing the nature thereof in more detail.

A tire constructed according to the present invention has greater resistance to shock and forces transmitted via the tread portion to the carcass portion by reason of the particular breaker strip employing randomly disposed lengths of wire. As can be seen from FIG. 2, the breaker strip is actually discontinuous. This discontinuity serves to interrupt transmission of the forces or shocks encountered and also to dissipate same. In contrast the conventional breaker strip, containing mutually parallel wires, is of more ordered, as distinguished from discontinuous character. Conseuently, forces which do not coincide with its axis of greatest strength are not interrupted and/or dissipated as with the tire construction of the present invention.

It is believed also quite evident that any beginnings of failure or deterioration in the edge portions, or any portion for that matter, of a breaker strip employing mutually parallel wires will be more quickly propagated leading to ultimate failure than in a breaker strip employing randomly disposed lengths of wire. In the latter case crack propagation or deterioration will be effectively shortstopped by the boundaries between the random discontinuous phases provided by the random location of the metal filaments.

Utilization of a breaker strip material employing the randomly disposed wire filaments also improves the puncture resistance of the tire construction as compared to a tire construction having only breaker strips employing wire filaments in mutually parallel relationship. In the latter type of construction, once a nail has passed between two adjacent parallel wires, it is free to penetrate without obstruction. However, in tires according to this construction, the breaker strip with random wires will have more than one layer of the wires which defines an improved barrier against penetration by nails and the like.

While we have disclosed certain preferred manners of accomplishing our invention and have disclosed a single embodiment in the drawings illustrating the invention, it is not our intention to be so limited inasmuch as various modifications will become apparent to those skilled in the art from our foregoing description and it is our intention to consider such modifications as within the spirit and scope of our invention as defined by the appended claims. In particular, the word wire is to be understood as covering not only metallic wire but also wires, cables, plaits, ribbons and the like made from any substantially nonextensible, non-compressible substance capable of being bonded to a vulcanizable elastomer e.g. plastic threads, glass fiber, etc.

We claim:

1. A vulcanized tire possessed of improved stability and improved uniform resistance to impact and punctures, said vulcanized tire comprising an inner carcass, a tread portion having spaced lateral edges integrally connected to said carcass but with the center portion spaced from said carcass, and a plurality of breaker strips integrally interposed between said carcass portion and said tread portion and substantially coextensive with said tread portion, one of said breaker strips comprising an elastomeric stock containing at least 10% by weight of randomly disposed, distorted lengths of wire.

2. A tire construction as claimed in claim 1 wherein the randomly disposed lengths of wire are about ¼ inch to about 1½ inches in length.

3. A tire construction as claimed in claim 1 wherein the randomly disposed lengths of wire are about ⅝ inch in length.

4. A tire construction as claimed in claim 1 which includes three breaker strips, two of said breaker strips each comprising a rubber stock containing a plurality of mutually parallel wire elements, each arranged so that they are located at angles to the elements in the other breaker strip and angular to the peripheral centerline of the tire.

5. A tire construction as claimed in claim 4 wherein the breaker strip including lengths of randomly disposed lengths of wire is disposed between the two breaker strips containing the parallel disposed elements.

6. A tire construction as claimed in claim 5 wherein the randomly disposed lengths of wire are about ⅝ inch in length.

7. A tire construction characterized by improved stability and improved uniform resistance to impact and punctures, said construction comprising an inner carcass, a tread portion having spaced lateral edges integrally connected to said carcass but with the center portion spaced from said carcass, and a plurality of breaker strips integrally interposed between said carcass and coextensive with said tread portion, one of said breaker strips comprising an elastomeric stock containing randomly disposed lengths of wire and a pair of parallel strips, angular in section, disposed along and beneath the lateral edges of said breaker strips.

8. A vulcanized tire possessed of improved stability and improved uniform resistance to impact and to punctures, said vulcanized tire comprising an inner carcass composed of a ply formed of rubber coated mutually parallel reinforcing strands disposed radially with respect to said carcass, a tread portion having spaced lateral edges integrally connected to said carcass but with the center portion spaced from said carcass, and at least three breaker strips integrally interposed between said carcass and said tread portion, and substantially coextensive therewith, the inner and outer of said breaker strips comprising a rubber stock containing a plurality of mutually parallel wire elements each arranged so that they are located at angles to elements in the other breaker strip and angular to the peripheral center line of the tire, the in-between breaker strip comprising an elastomeric stock containing between 10 and 40 percent by weight of randomly disposed lengths of wire distorted out of their normal linear form.

References Cited in the file of this patent
UNITED STATES PATENTS

| | | |
|---|---|---|
| 2,020,190 | Jones | Nov. 5, 1935 |
| 2,056,012 | Madge et al. | Sept. 29, 1936 |
| 2,493,614 | Bourdon | Jan. 3, 1950 |
| 2,960,139 | Engstrom et al. | Nov. 15, 1960 |

OTHER REFERENCES

Continental, German Application 1,029,693, printed May 8, 1958 (Kl. 63e 5/01).